United States Patent
Venkataraman et al.

(10) Patent No.: US 10,175,364 B2
(45) Date of Patent: Jan. 8, 2019

(54) SYSTEMS AND METHODS FOR ESTIMATING WHETHER A RECEIVER IS INSIDE OR OUTSIDE A BUILDING

(71) Applicant: NextNav, LLC, Sunnyvale, CA (US)

(72) Inventors: Jagadish Venkataraman, San Jose, CA (US); Ganesh Pattabiraman, Sarotaga, CA (US)

(73) Assignee: NextNav, LLC, Sunnyvale, CA (US)

( * ) Notice: Subject to any disclaimer, the term of this patent is extended or adjusted under 35 U.S.C. 154(b) by 535 days.

(21) Appl. No.: 14/749,593

(22) Filed: Jun. 24, 2015

(65) Prior Publication Data

US 2016/0003949 A1    Jan. 7, 2016

Related U.S. Application Data

(60) Provisional application No. 62/019,745, filed on Jul. 1, 2014.

(51) Int. Cl.
  *G01S 19/46* (2010.01)
  *G01S 1/08* (2006.01)
  (Continued)

(52) U.S. Cl.
  CPC ........... *G01S 19/46* (2013.01); *G01S 1/08* (2013.01); *G01S 19/22* (2013.01); *G01S 19/24* (2013.01); *G01S 19/28* (2013.01)

(58) Field of Classification Search
  CPC . G01S 19/46; G01S 1/08; G01S 19/22; G01S 19/24; G01S 19/28
  (Continued)

(56) References Cited

U.S. PATENT DOCUMENTS

| 9,622,026 B2* | 4/2017 | Yu ........................... H04W 4/02 |
| 2012/0087212 A1* | 4/2012 | Vartanian ................ G01S 15/08 367/118 |

(Continued)

FOREIGN PATENT DOCUMENTS

| JP | H09297171 A | 11/1997 |
| JP | 2002214322 A | 7/2002 |
| JP | 2009168516 A | 7/2009 |

OTHER PUBLICATIONS

Form PCT/ISA/226, PCT/US2015/037541, "Invitation to Pay Additional Fees and, Where Applicable, Protest Fee", 5 page(s); and European Patent Office, "Patent Abstracts of Japan" for Pub. Nos. 2002214322, 09297171 and 2009168516, page(s) 3. Date of Mailing Oct. 1, 2015.

(Continued)

Primary Examiner — Harry K Liu

(57) ABSTRACT

Systems and methods for estimating whether a receiver is indoors or outdoors. Certain approaches evaluate data associated with a network of beacons to determine whether the receiver is indoors or outdoors. Such evaluation may include any of determining whether azimuthal angles corresponding to the beacons meet an azimuthal angle condition, determining whether elevation angles corresponding to the beacons meet an elevation angle condition, determining whether signal strengths corresponding to the beacons meet a signal strength condition, and determining whether other measurements associated with the beacons meet other measurement conditions.

34 Claims, 8 Drawing Sheets

(51) Int. Cl.
*G01S 19/22* (2010.01)
*G01S 19/24* (2010.01)
*G01S 19/28* (2010.01)

(58) Field of Classification Search
USPC .................................................. 342/357.29
See application file for complete search history.

(56) References Cited

U.S. PATENT DOCUMENTS

| | | | |
|---|---|---|---|
| 2013/0179075 A1* | 7/2013 | Haverinen | G01C 21/08 |
| | | | 701/525 |
| 2014/0266909 A1* | 9/2014 | Palanki | G01S 5/0278 |
| | | | 342/451 |
| 2014/0274114 A1* | 9/2014 | Rowitch | H04W 4/029 |
| | | | 455/456.1 |
| 2016/0258772 A1* | 9/2016 | Chang | G01S 5/0263 |

OTHER PUBLICATIONS

Form PCT/ISA/210, Intl. Appl. No. PCT/US2015/037541, International Search Report, 7 pages; and Form PCT/ISA/237, Intl. Appl. No. PCT/US2015/037541, Written Opinion of the International Search Authority, 10 pages (dated Dec. 7, 2015).

\* cited by examiner

SYSTEMS AND METHODS FOR ESTIMATING WHETHER A RECEIVER IS INSIDE OR OUTSIDE A BUILDING

FIELD

Various embodiments relate to wireless communications, and more particularly, to networks, devices, methods and machine-readable media for estimating whether a receiver is indoors or outdoors by evaluating measurements that correspond to a network of beacons.

BACKGROUND

Quickly and accurately estimating locations of people in a geographic area can be used to speed up emergency response times, track business assets, and link consumers to nearby businesses. Various positioning systems are used to estimate the position of a person, including satellite positioning systems, terrestrial positioning systems and hybrid versions of satellite and terrestrial positioning systems. Each system usually includes a receiver that: receives signals from satellite and/or terrestrial beacons; computes distances traveled by those signals; and then uses geometry to estimate its position using the computed distances and knowledge of each beacon's location.

The accuracy of the receiver's estimated position can be improved with knowledge that the receiver is inside a building ("indoors") or outside a building ("outdoors"). Depending on where the receiver resides, positioning algorithms can be applied differently by exploiting previously known multipath profile information, accounting for signal strength loss due to building walls, weighing different signal constellations differently, and accounting for other considerations. Knowledge of whether a receiver is indoors or outdoors can also improve user experience by aiding the identification of appropriate building maps, and can be used to aggregate statistics such as what percentage of E-911 calls are made from indoor locations as from outdoor locations.

Unfortunately, techniques that estimate whether a receiver is indoors or outdoors lack precision and/or are too slow. Thus, there is a need for improved techniques to estimate whether the receiver is indoors or outdoors.

SUMMARY

Certain embodiments of this disclosure relate generally to networks, devices, methods and machine-readable media for estimating whether a receiver is indoors or outdoors using ranging signals from beacons. These embodiments may determine whether the receiver is indoors or outdoors based on whether azimuthal angles corresponding to the beacons meet an azimuthal angle condition, whether elevation angles corresponding to the beacons meet an elevation angle condition, whether signal strengths corresponding to the beacons meet a signal strength condition, or whether other measurements associated with the beacons meet other measurement conditions.

DETAILED DESCRIPTION

Various systems and methods for estimating when a receiver is inside or outside a building are described below.

Systems for Estimating a Location of a Receiver

Figure 1:
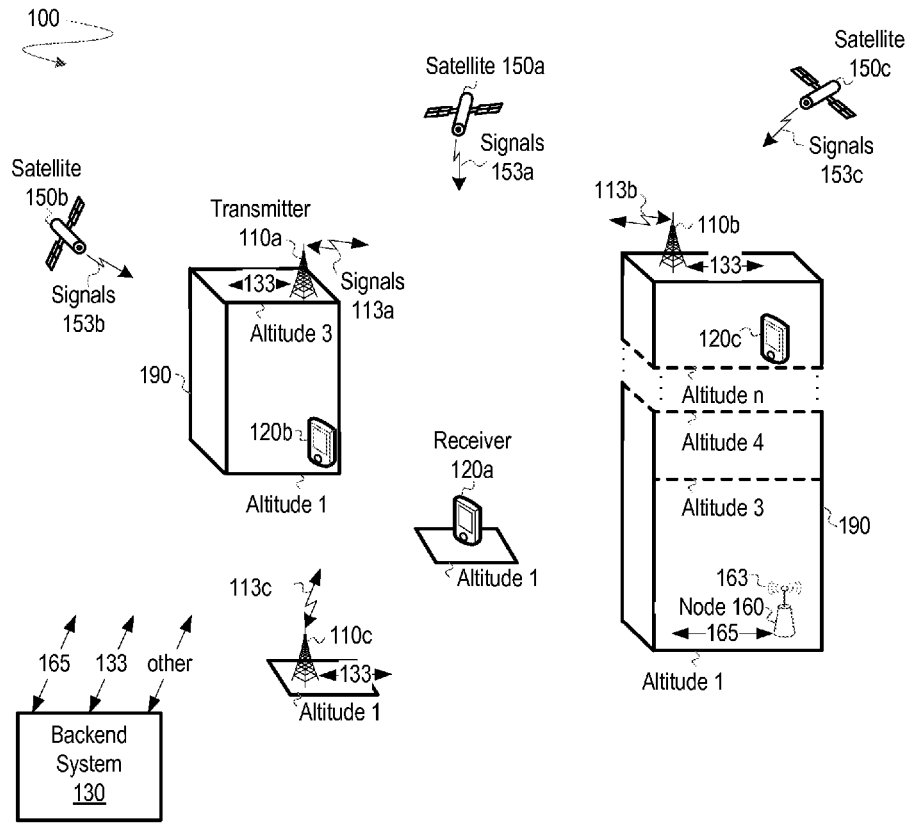
FIG. 1 depicts examples of satellite and terrestrial positioning systems.

FIG. 1 illustrates a positioning system 100, on which various embodiments may be implemented. The positioning system 100 includes any number of receivers 120 configured to acquire and track signals provided from a network of beacons—e.g., terrestrial transmitters 110, a network of satellites 150, and/or another network node 160 (e.g., cellular, Wi-Fi, Ethernet, other communication network). The system 100 includes a backend system 130, which may include one or more processors, data sources, and other components (not shown). The backend 130 may be used for signal processing, computations in relation to collected data, and other types of processing described herein.

Various receivers 120 are depicted at various altitudes 1 to n, and are also depicted inside or outside various buildings (e.g., such as building 190), as shown in FIG. 1 for simplicity; however, the system 100 may be configured to support more receivers and more altitudes (or depths below some reference altitude). Each receiver 120 may include a location computation engine (not shown) to determine positioning information based on the signals received from the transmitters 110, the satellites 150, and/or the node 160. In certain embodiments, the receivers 120 receive signals from beacons (e.g., the transmitters 110 and/or the satellites 150), and by computing the ranges to each of those beacons, the receiver 120 can estimate its position using the family of mathematical techniques collectively referred to as trilateration. Examples of positioning information include travel time of the received signals based on estimated times of arrival (TOAs) for the signals, and pseudorange data (e.g., measurements of range to the beacons) based on the estimated travel times of the received signals from various transmitters.

The receivers 120 may receive signals from and/or send signals to the transmitters 110, the satellites 150, and the node 160 via corresponding communication links 113, 153 and 163, and may also receive signals from and/or send signals to the backend system 130 or other receivers 120. Connectivity between the receiver 120 and other systems may be carried out using wired means (e.g., Ethernet, USB, flash RAM, or other channels as is known or later developed in the art), or wireless means (general radio frequency, Wi-Fi, Wi-Max, Bluetooth, or other channels as is known or later developed in the art).

Figure 2:
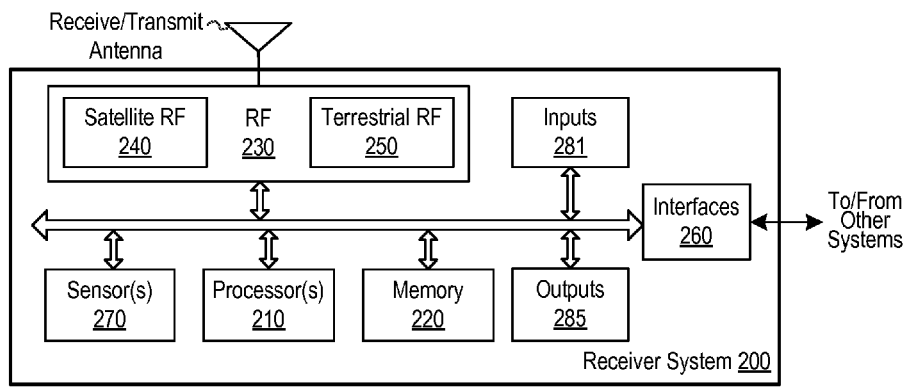
FIG. 2 depicts an example of a receiver system.

FIG. 2 illustrates details of a receiver system 200, at which signals from beacons are received and processed to extract information used to determine if the receiver system 200 is inside or outside a building. Each receiver system 200 may be in the form of a cellular or smart phone, a tablet device, a PDA, a notebook, a digital camera, an asset tracking tag, an ankle bracelet or other computing device. It is noted that User Equipment (UE), Mobile Station (MS), User Terminal (UT), SUPL Enabled Terminal (SET), Receiver (Rx), and Mobile Device may be used to refer to the receiver system 200.

As shown, one or more memories 220 of the receiver system 200 are coupled to one or more processor(s) 210 and an RF component 230 to provide storage and retrieval of data and/or instructions that may be executed by the processor(s) 210 and/or processors included in the RF component 230 to carry out methodologies described herein.

An RF component 230, which controls the exchange of information with other systems (e.g., a transmitter 110 or a satellite 150), is shown to include a satellite component 240 and a terrestrial component 250. The satellite component 240 and the terrestrial component 250 may use separate or shared resources such as antennas, RF circuitry, processors and the like to perform signal processing as is known in the art or otherwise disclosed herein. An example of a satellite RF component 240 includes a GNSS chip (often referred to as a GNSS receiver), which processes signals from each satellite 150, and extracts measurements that correspond to that satellite (e.g., azimuth angles, elevation angles, strengths of the signals, and time or arrival measurements of the signals that correspond to that satellite). The terrestrial RF component 250 may process signals from each transmitter 110, and extract similar measurements.

The processor(s) 210, processors in the RF component 230, or processors at the backend 130 may also perform the following methodologies to estimate whether the receiver system 200 is indoors or outdoors based on the above and other measurements.

Determining Measurements that Correspond to Networks of Beacons

Figure 3A:
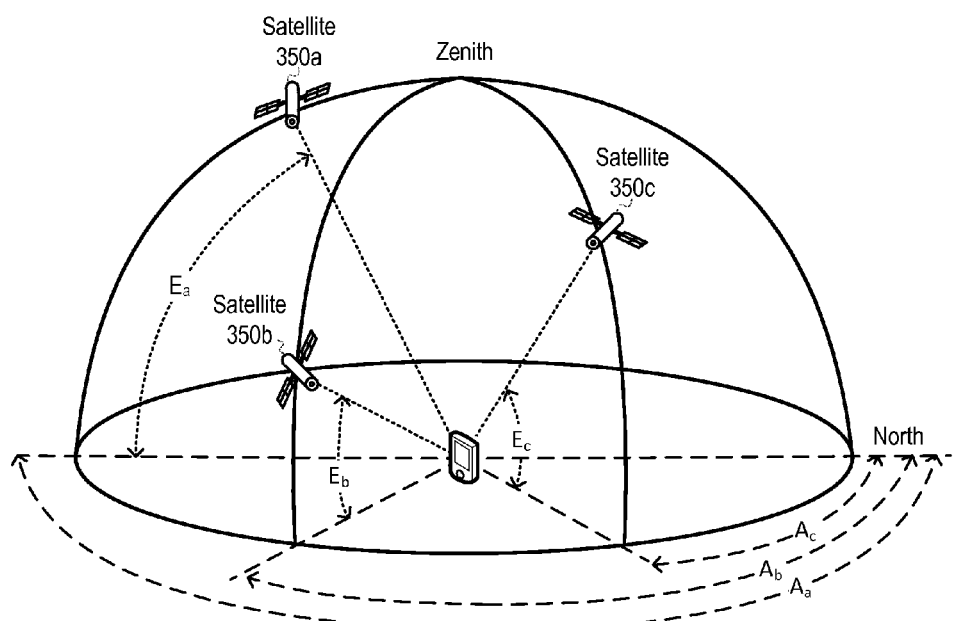
FIG. 3A depicts an environment for determining if a receiver is indoors or outdoors based on azimuthal angles and elevation angles of satellites.
Figure 3B:
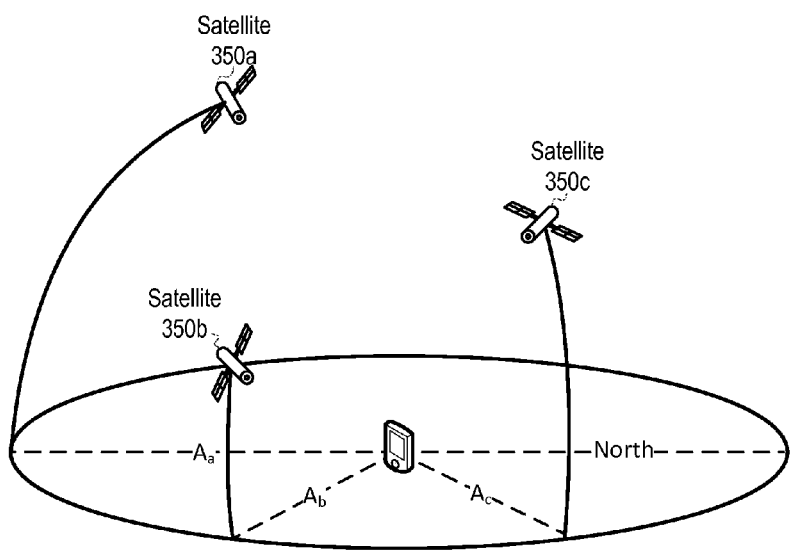
FIG. 3B depicts an environment for determining if a receiver is indoors or outdoors based on azimuthal angles of satellites.
Figure 3C:
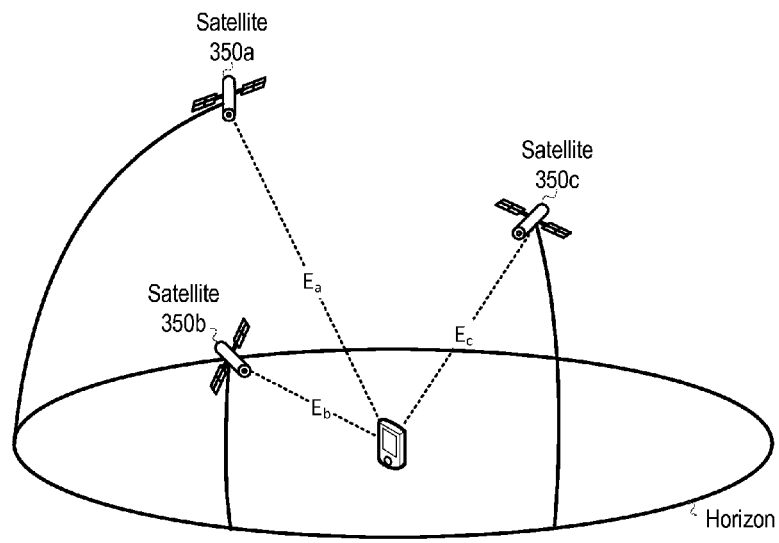
FIG. 3C depicts an environment for determining if a receiver is indoors or outdoors based on elevation angles of satellites.

As mentioned above, various measurements relating to a network of beacons can be determined, and then used to estimate whether a receiver is indoors or outdoors. Two such measurements include an azimuthal angle and an elevation angle of each beacon in the network of beacons. FIG. 3A depicts a satellite positioning system that includes spatially-distributed satellites 350a, 350b and 350c located at different combinations of azimuthal angles $A_a$, $A_b$ and $A_c$, and elevation angles $E_a$, $E_b$ and $E_c$, respectively. FIG. 3B illustrates the azimuthal angles $A_a$, $A_b$ and $A_c$ as measured from true or magnetic north. FIG. 3C illustrates the elevation angles $E_a$, $E_b$ and $E_c$ as measured from a horizon.

In an open sky environment, the satellites tracked by the receiver (e.g., using the satellite RF component 240) tend to be fairly well distributed across the sky, both in azimuth and elevation. As the environment progressively degrades from a rural setting, to an urban setting, to a dense urban canyon setting, and to an indoor setting, the satellite visibility changes to reflect the change in the settings.

In order to assess the evenness of beacon distribution around a receiver, it is useful to partition the 0 to 360 degrees of azimuthal angles and the 0 to 90 degrees of elevation angles into bins of predetermined sizes (e.g., 30-60 degrees for azimuthal bins and 10-30 degrees for elevation bins). Once bins are formed, the number of bins that include a satellite can be considered to determine whether a desired distribution of visible satellites is achieved—e.g., to reduce geometric position error often represented by a "dilution of precision" (DOP) value, which refers to a measure of the evenness of distribution (e.g., azimuthal and elevation distribution) of visible satellites with respect to a receiver's location. The terminology "visible" or "in view" is sometimes used to denote the fact that a received signal from a beacon is distinguishable from noise.

In a rural setting, at least one satellite is typically visible in each azimuthal and elevation angle bin. In an urban setting, satellites in a few azimuthal and elevation angle bins may be blocked by buildings depending on the sizes of the bins. In a dense urban canyon setting, the receiver could potentially be surrounded by high rises in two or more directions such that no more than 50% of the azimuthal angle bins may be populated, but there is still a good possibility that most or even all the elevation angle bins are populated. When the receiver enters a building, a few satellite signals may reach the receiver from only a few azimuthal and elevation angle bins. Thus, the azimuthal and elevation angle bins will be populated very differently from one location to the next. What is highly likely, however, is that there is at least one empty azimuthal angle bin and one empty elevation angle bin. Methods described below exploit the way azimuthal and elevation angle bins are sized and get populated in order to determine whether a receiver is indoors or outdoors.

There are various ways to determine the azimuthal and elevation angles, as are readily known in the art. For example, standard GNSS receivers (e.g., the satellite RF component 240 of FIG. 2) predict the XYZ coordinates of a satellite based on orbital data those GNSS receivers demodulate from that satellite's data bits. The GNSS receivers then reference the XYZ coordinates of each satellite to a coordinate system (e.g., the WGS84 coordinate system whose origin lies at the center of the Earth). The azimuthal and elevation angles can then be referenced to the surface of the earth, and may be obtained from a deterministic transformation independent of the receiver orientation.

Other measurements beyond azimuthal and elevation angles may also be used to estimate whether a receiver is indoors or outdoors. Such measurements include measured signal strengths of received signals, including signal to noise ratios.

As described below, and depicted in FIG. 4A through FIG. 11, the above measurements may be individually or collectively used to estimate whether a receiver is indoors or outdoors.

Figure 7:
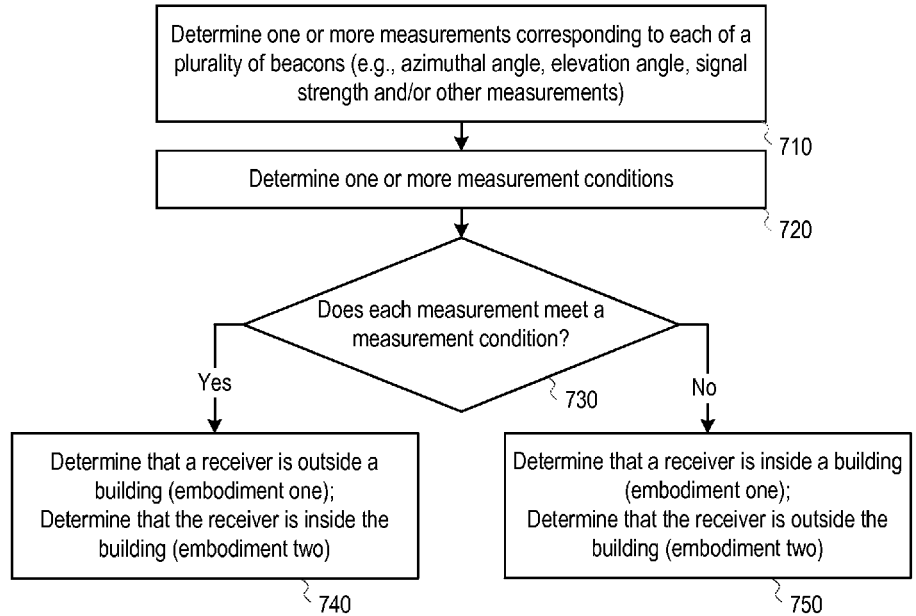
FIG. 7 illustrates an example process for determining whether a receiver is inside or outside based on measurements corresponding to beacons.

Estimating if a Receiver is Indoors or Outdoors Based on the Measurements that Correspond to a Network of Beacons FIG. 7 illustrates a process for determining whether a receiver is inside or outside based on measurements that correspond to beacons. As shown, one or more measurements corresponding to each of a plurality of beacons are determined (710). Examples of measurements include azimuthal angles, elevation angles, signal strengths and other measurements described herein or otherwise known by one of skill in the art. One or more measurement conditions are identified (720), and a determination is made as to whether those identified measurement conditions are met by the determined measurements (730). Examples of measurement conditions are provided in relation to FIG. 8 through FIG. 11.

Various embodiments are contemplated that interpret the measurement conditions differently. In a first embodiment, the location of the receiver is estimated as being outside a building when the measurement conditions are met (740), and the location of the receiver is estimated as being inside a building when the measurement conditions are not met (750). In a second embodiment, the location of the receiver is estimated as being inside the building when the measurement conditions are met (740), and the location of the receiver is estimated as being outside the building when the measurement conditions are not met (750).

Evaluating Azimuthal Angles Corresponding to Beacons

Figure 8:
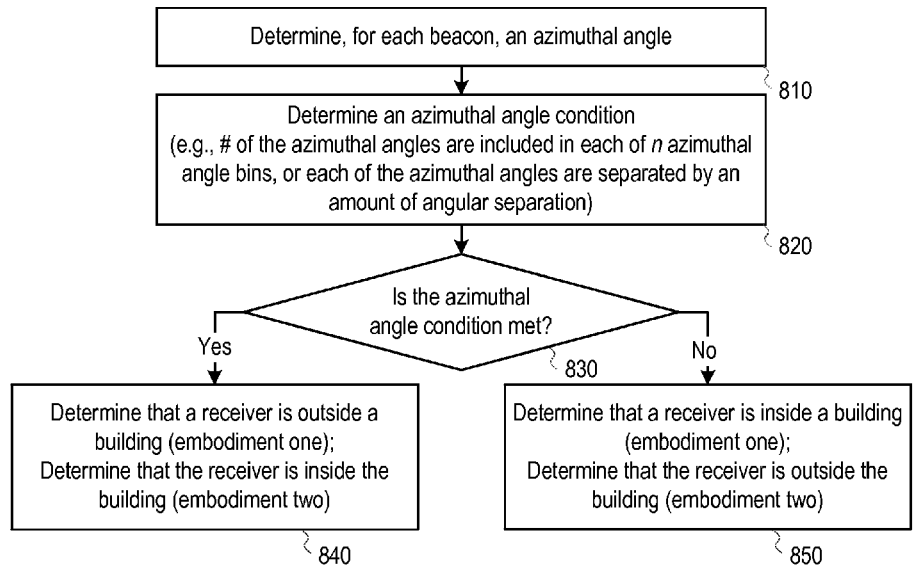
FIG. 8 illustrates an example process for determining whether a receiver is inside or outside based on azimuthal angles corresponding to beacons.

FIG. 8 illustrates a process for determining whether a receiver is inside or outside based on azimuthal angles that correspond to beacons. When discussing FIG. 8, reference is also made to FIG. 4A, which depicts an environment within which a receiver's location is estimated as indoors or outdoors based on whether enough azimuthal angles of satellites are included in various azimuthal angle bins. Reference is also made to FIG. 4B, which depicts an environment within which a receiver's location is estimated as indoors or outdoors based on whether enough azimuthal angles of satellites are separated by a predefined amount of azimuthal angular separation.

As shown in FIG. 8, an azimuthal angle is determined for each beacon (810). An azimuthal angle condition is also identified (820), and a determination is made as to whether azimuthal angle condition is met (830). In a first embodiment, the location of the receiver is estimated as being outside a building when the azimuthal angular condition is met (840), and the location of the receiver is estimated as being inside a building when the azimuthal angular condition is not met (850). In a second embodiment, the location of the receiver is estimated as being inside the building when the azimuthal angular condition is met (840), and the location of the receiver is estimated as being outside the building when the azimuthal angular condition is not met (850).

Two azimuthal angle conditions are described in further detail below.

First Azimuthal Angle Condition

Under the first azimuthal angle condition, a predetermined number of the azimuthal angles must be included in each of n azimuthal angle bins. The predetermined number of azimuthal angles may be any number, and preferably includes at least one angle. The n bins may include any number of bins, and preferably include 6 to 12 bins (where the bins range in size between 30 and 60 degrees). Of course, other numbers and sizes of bins may be used.

Figure 4A:
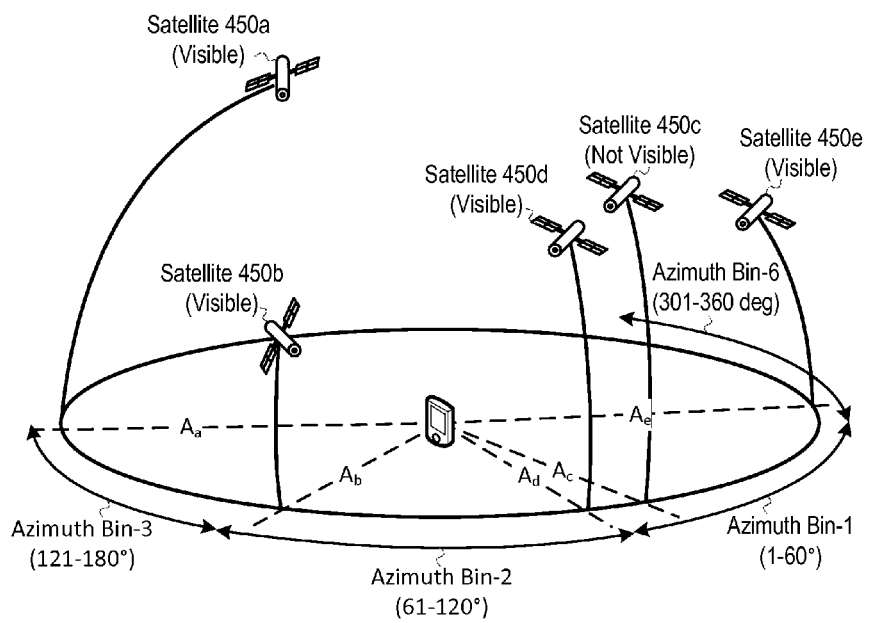
FIG. 4A depicts an environment for determining if a receiver is indoors or outdoors based on whether enough azimuthal angles of satellites are included in various azimuthal angle bins.
Figure 4B:
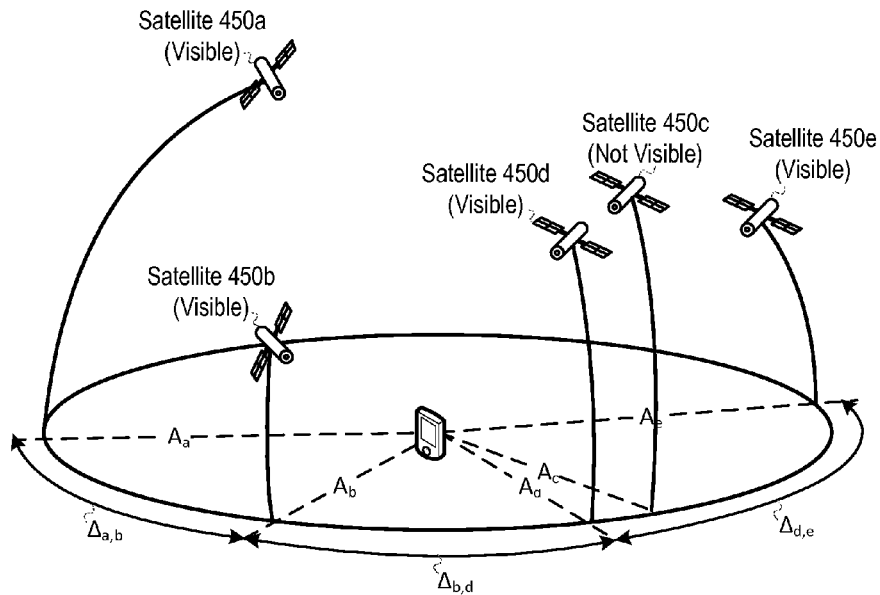
FIG. 4B depicts an environment for determining if a receiver is indoors or outdoors based on whether enough azimuthal angles of satellites are separated by a minimum amount of azimuthal angular separation.

FIG. 4A illustrates a situation when the first condition is not met. As shown, five satellites 450*a-e* are depicted along five different azimuthal angles $A_{a-e}$, but only four satellites 450*a*, 450*b*, 450*d* and 450*e* are visible. Even if the predetermined number of azimuthal angles is set to one, only three of the n=4 bins that are shown include one azimuthal angle. Thus, the first azimuthal angle condition is not met because satellite 450*c*, which is not visible, is the only satellite along an azimuthal angle that is included in one of the bins.

Closer inspection of the satellite layout in FIG. 4A reveals that the four visible satellites are well-distributed in terms of azimuthal angle separation. Thus, one could "re-draw" the bins so each bin includes one of the four visible satellites. Thus, the bins need not be predetermined, and the boundaries of each bin can be determined after azimuthal angles of the beacons are determined so that each bin includes a visible satellite. Alternatively, the angular separation of each measured azimuthal angle can be determined without forming bins, as is explored below in relation to the second azimuthal angle condition.

Second Azimuthal Angle Condition

Under the second azimuthal angle condition, a predetermined number of the azimuthal angles must be separated by a predetermined amount of angular separation. The predetermined amount of angular separation may include any amount of angular separation, and preferably includes at least 20 degrees of separation and/or no more than 70 degrees of separation. The number of azimuthal angles that are separated by the predetermined amount of angular separation may include any number of angles, and preferably include 6 to 12 angles. Of course, other numbers and sizes of bins may be used.

FIG. 4B illustrates a situation when the second condition is met, even though the first condition is not met. Azimuthal angular separations ($\Delta$) between various satellites are shown. For sake of illustration, it is assumed that $\Delta_a$, $\Delta_{b,d}$, and $\Delta_{d,e}$ each satisfy a predetermined azimuthal angular separation requirement (e.g., at least four satellites each separated by more than 50 degrees).

Evaluating Elevation Angles Corresponding to Beacons

Figure 9:
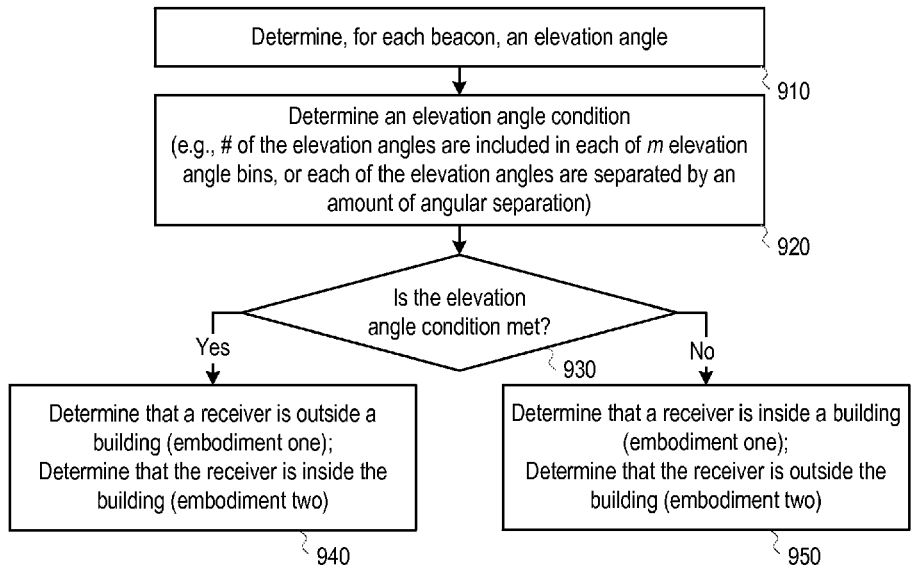
FIG. 9 illustrates an example process for determining whether a receiver is inside or outside based on elevation angles corresponding to beacons.

FIG. 9 illustrates a process for determining whether a receiver is inside or outside based on elevation angles that correspond to beacons. When discussing FIG. 9, reference is also made to FIG. 5A, which depicts an environment within which a receiver's location is estimated as indoors or outdoors based on whether enough elevation angles of satellites are included in various elevation angle bins. Reference is also made to FIG. 5B, which depicts an environment within which a receiver's location is estimated as indoors or outdoors based on whether enough elevation angles of satellites are separated by a predefined amount of elevation angular separation.

As shown in FIG. 9, an elevation angle is determined for each beacon (910). An elevation angle condition is also identified (920), and a determination is made as to whether elevation angle condition is met (930). In a first embodiment, the location of the receiver is estimated as being outside a building when the elevation angular condition is met (940), and the location of the receiver is estimated as being inside a building when the elevation angular condition is not met (950). In a second embodiment, the location of the receiver is estimated as being inside the building when the elevation angular condition is met (940), and the location of the receiver is estimated as being outside the building when the elevation angular condition is not met (950).

Two elevation angle conditions are described in further detail below.

First Elevation Angle Condition

Under the first elevation angle condition, a predetermined number of the elevation angles must be included in each of m elevation angle bins. The predetermined number of elevation angles may be any number, and preferably includes at least one angle. The m bins may include any number of bins, and preferably include 6 to 9 bins (where the bins range in size between 10 and 15 degrees). Of course, other numbers and sizes of bins may be used.

Figure 5A:
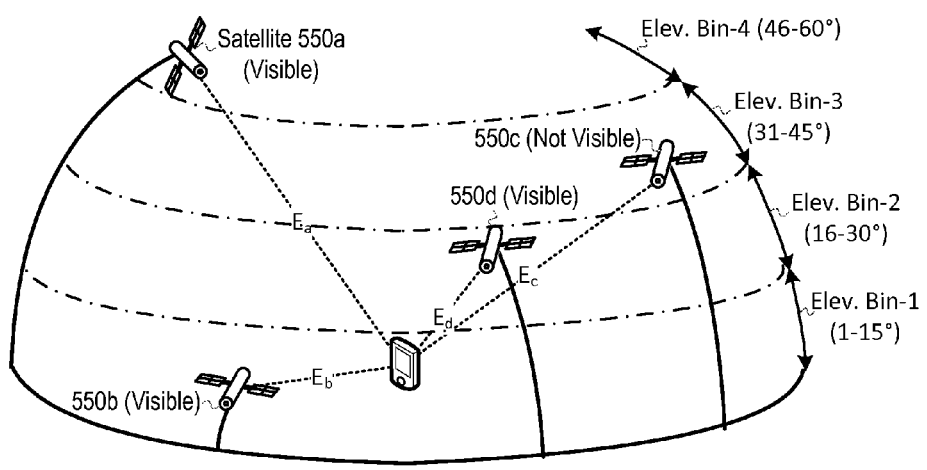
FIG. 5A depicts an environment for determining if a receiver is indoors or outdoors based on whether enough elevation angles of satellites are included in various elevation angle bins.
Figure 5B:
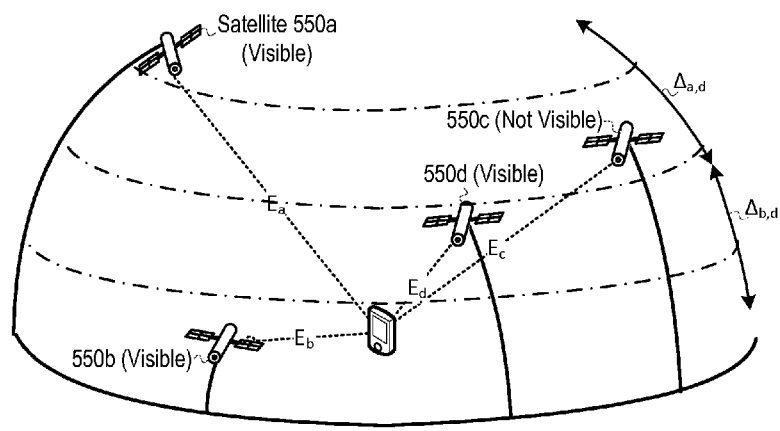
FIG. 5B depicts an environment for determining if a receiver is indoors or outdoors based on whether enough elevation angles of satellites are separated by a minimum amount of elevation angular separation.

FIG. 5A illustrates a situation when the first condition is not met. As shown, four satellites 450a-d are depicted along four different elevation angles $E_{a-d}$, but only three satellites 450a, 450b and 450d are visible. Even if the predetermined number of elevation angles is set to one, only three of the m=4 bins that are shown include one elevation angle. Thus, the first elevation angle condition is not met because satellite 450c, which is not visible, is the only satellite along an elevation angle that is included in the third elevation angle bin. Unlike the azimuthal angle example above, having only three visible satellites makes it impossible to "re-draw" the m=4 bins so each bin includes a visible satellite. Consequently, the angular separation approach described below may need to be used.

Second Elevation Angle Condition

Under the second elevation angle condition, a predetermined number of the elevation angles must be separated by a predetermined amount of angular separation. The predetermined amount of angular separation may include any amount of angular separation, and preferably includes at least 10 degrees of separation and/or no more than 30 degrees of separation. The number of elevation angles that are separated by the predetermined amount of angular separation may include any number of angles, and preferably include 3 to 9 angles.

FIG. 5B illustrates a situation when the second elevation angle condition is met, even though the first elevation angle condition is not met. Elevation angular separations (A) between various satellites are shown. For sake of illustration, it is assumed that $\Delta_{a,d}$ and $\Delta_{b,d}$ each satisfy a predetermined elevation angular separation requirement (e.g., at least three elevation angles separated by more than 10 degrees).

Evaluating Signal Strengths Corresponding to Beacons

In outdoor settings, the distribution of signal strength (e.g., $C/N_0$ values) of tracked satellites tends to be similar across rural, urban and dense urban settings. However, there is often a noticeable change in distribution when a receiver is indoors.

In outdoor settings, whether in an open sky rural environment or in a dense urban setting, the satellites that the receiver tracks tend to have high signal strengths. The multipath profile may change based on the outdoor setting, but the signal strength distribution tends to be quite uniform.

The signal strengths for signals entering indoor settings will vary depending on the materials through which the signals pass. For example, signals that tend to reach the receiver from overhead through the roof of a building are usually much weaker than signals that reach the receiver through doors or windows. Hence, the signal strengths of tracked satellites tend to have a larger spread indoors as compared to outdoors.

Figure 6:
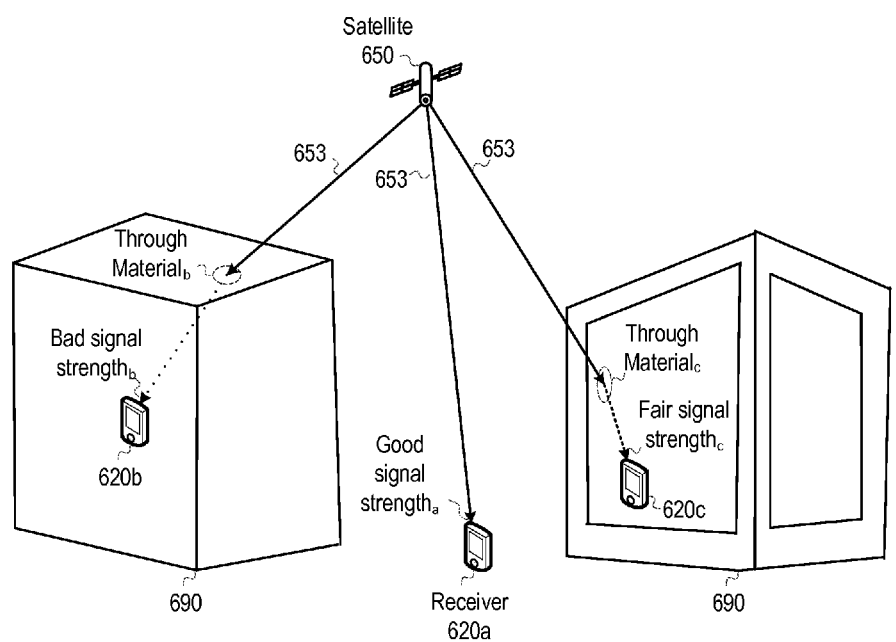
FIG. 6 depicts an environment for determining if a receiver is indoors or outdoors based on a signal strength measurement of a signal transmitted by a satellite.

FIG. 6 illustrates the possible differences in signal strengths. As shown, a receiver 620a that is located outside measures a "good" signal strength that is relatively high. The other two receivers 620b and 620c are located inside different buildings, where they measure different signal strengths. The receiver 620b is located under $material_b$ (e.g., a thick roof of metal and/or cement, and possibly different floors), and consequently measures a "bad" signal strength that is relatively low because of $material_b$. The receiver 620c is located behind $material_c$ (e.g., a thin glass window), and consequently measures a "fair" signal strength that is higher than the signal strength measured by the receiver 620b, but possibly lower than the signal strength measured by the receiver 620a.

Figure 10:
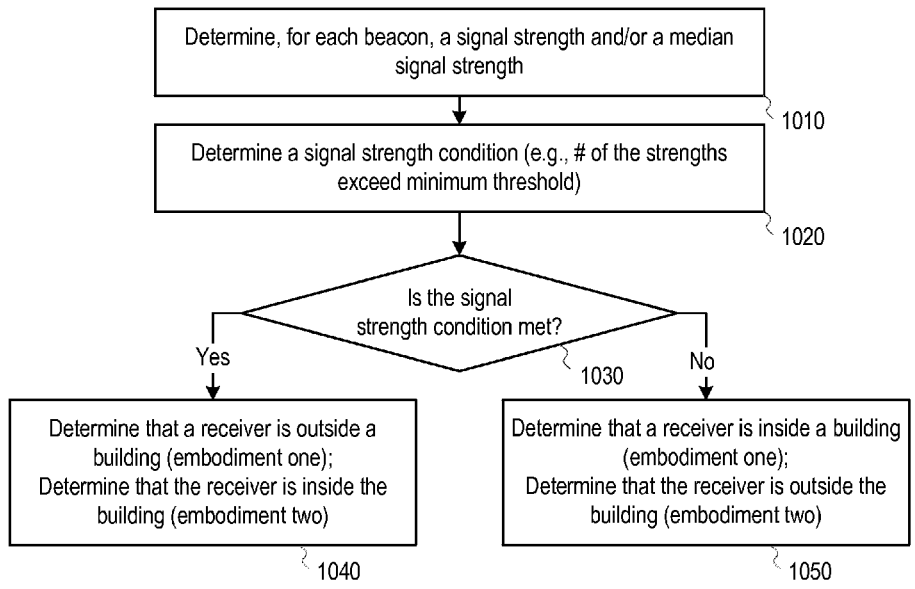
FIG. 10 illustrates an example process for determining whether a receiver is inside or outside based on signal strengths corresponding to beacons.

FIG. 10 illustrates a process for determining whether a receiver is inside or outside based on signal strengths that correspond to beacons. As shown in FIG. 10, a signal strength and/or a median signal strength is determined for each beacon (1010). A signal strength condition is also identified (1020), and a determination is made as to whether signal strength condition is met (1030). In a first embodiment, the location of the receiver is estimated as being outside a building when the signal strength condition is met (1040), and the location of the receiver is estimated as being inside a building when the signal strength condition is not met (1050). In a second embodiment, the location of the receiver is estimated as being inside the building when the signal strength condition is met (1040), and the location of the receiver is estimated as being outside the building when the signal strength condition is not met (1050).

It is noted that there are different approaches for evaluating signal strength of received signals. In certain systems, different values may be used to specify signal strength, including received signal code power (RSCP) values, reference signal received power (RSRP) values, and received signal strength indicator (RSSI) values. By way of example, signal strength is often represented in a dBm format, where values that approach 0 are stronger. For example, −41 dBm is better signal strength than −61 dBm using this format. In one embodiment, −100 dBm or less corresponds to unacceptable coverage, −99 dBm to −90 dBm corresponds to weak/bad coverage, −89 dBm to −70 dBm corresponds to medium/fair coverage, and −69 dBm or greater corresponds to strong/good coverage.

In some embodiments, the signal strength is tracked in terms of a signal-to-noise (SNR) ratio, which is the signal level minus the noise level. The noise level indicates the amount of background noise in the environment, which often increases indoors. Like signal strength, a noise level is often measured in dBm format, where −96 dBm is a lower noise level than −20 dBm. By way of example, a signal level of −53 dBm and a noise level of −90 dBm yields a SNR of +37 dB. A higher SNR value usually means that the signal strength is stronger in relation to the noise levels. By way of example, greater than 40 dB SNR may correspond to an excellent signal, 25 dB to 40 dB SNR may correspond to a good signal, 15 dB to 25 dB SNR can correspond to a fair signal, 10 dB to −15 dB SNR may correspond to a bad signal, and less than −15 dB SNR can correspond to an unusable signal.

In some embodiments, the signal strength condition specifies that at least one signal strength associated with each of a predetermined number of visible satellites (e.g., some or all of the visible satellites) must exceed a signal strength threshold amount (e.g., at least 30 dBm). In other embodiments, the signal strength condition specifies that a median signal strength associated with each of a predetermined number of visible satellites (e.g., some or all of the visible satellites) must exceed a median signal strength threshold amount (e.g., at least 20 dBm). In other embodiments, both of the above conditions must be met. The predetermined number of visible (or "in view") satellites may be based on a minimum percentage of those satellites (e.g., at least half).

Evaluating Azimuthal Angles, Elevation Angles and Signal Strengths

Figure 11:
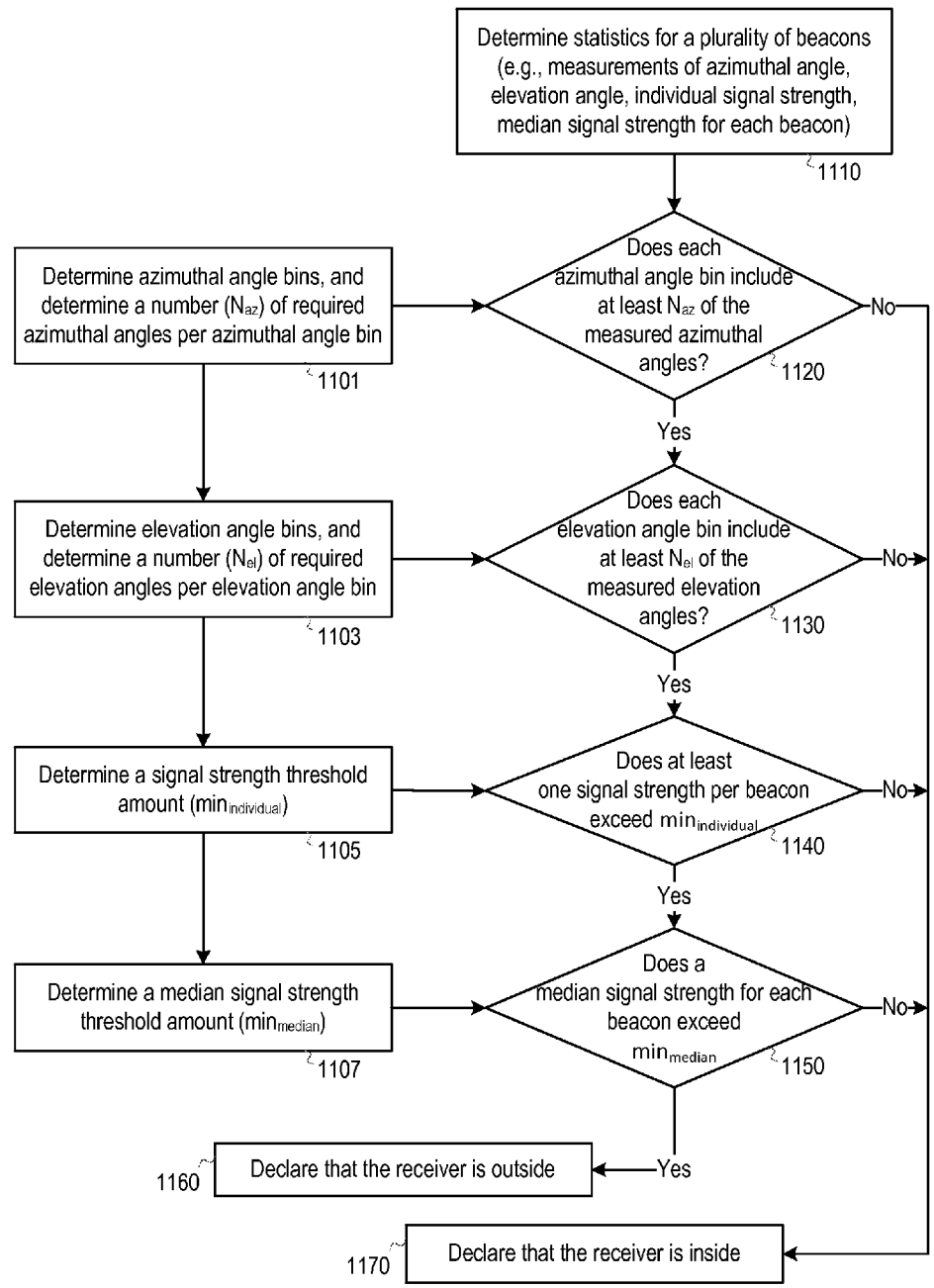
FIG. 11 illustrates an example process for determining whether a receiver is inside or outside based on azimuthal angles, elevation angles and signal strengths corresponding to beacons.

FIG. 11 illustrates an example process for determining whether a receiver is inside or outside based on azimuthal angles, elevation angles and signal strengths corresponding to beacons.

As shown, various evaluation parameters are determined, including:
(i) a number or a size of azimuthal angle bins (e.g., between 6 and 12 bins, or between 30 and 60 degrees in size) and a number (e.g., $N_{az}=1$) of required azimuthal angles per azimuthal angle bin (1101);
(ii) a number or a size of elevation angle bins (e.g., between 3 and 9 bins, or between 10 and 30 degrees in size) and a number (e.g., $N_{el}=1$) of required elevation angles per elevation angle bin (1103);
(iii) a signal strength threshold amount ($\min_{individual}$) (e.g., at least 30 dBm) (1105); and
(iv) a median signal strength threshold amount ($\min_{median}$) (e.g., at least 20 dBm) (1107).

Statistics for a plurality of beacons (e.g., statistics like measurements of azimuthal angles, elevation angles, individual signal strengths, median signal strengths for each beacon) are determined (1110). The statistics are evaluated to determine if various conditions are met. Examples of such conditions include:
(i) whether each azimuthal angle bin includes at least $N_{az}$ of the measured azimuthal angles (1120),
(ii) whether each elevation angle bin includes at least $N_{el}$ of the measured elevation angles (1130),
(iii) whether at least one signal strength per beacon exceeds $\min_{individual}$ (1140), and
(iv) whether a median signal strength for each beacon exceeds $\min_{median}$ (1150).

If all of the conditions are met, the receiver is estimated as being outside (1160). If any of the conditions are not met, the receiver is estimated as being inside (1170).

Variations on Use of Signal Strength

Measured signal strengths over time may, in some embodiments, be relied upon more than individual signal strengths.

For example, the median signal strength associated with a beacon may be based on any number of signal strengths measured over a period of time (e.g., over a period of t seconds, where t=30 or another value). Consideration of median signal strength instead of an individual signal strength at a particular instance in time, while potentially requiring more time to process, can enable certain beacons to come into view that may be out of view at the particular instance in time due to an obstruction between that beacon and the receiver, which permits consideration of that beacon, or consideration of the change in signal strengths over time.

Changes of signal strength can be tracked over time (e.g., strong to weak, weak to strong, or minimal change not exceeding some threshold amount of required change to be significant). The changes can be used to estimate whether the receiver is indoors or outdoors. For example, a minimal change may indicate that the same obstructions are generally affecting the signal strength. Thus, a change in signal strength (compared to an instance of signal strength) cannot be used to determine an indoor or outdoor position. Instead, consistent strong/high signal strength may indicate an outdoor position, and consistent weak/low signal strength may indicate an indoor position.

By comparison, a measured change from strong to weak, or weak to strong, may indicate degraded reception of signals from a beacon at one point in time, but less degraded or clearer reception of signals from that beacon during another point in time. A strong to weak change could indicate a receiver has entered an indoor location from an outdoor location, and a weak to strong change could indicate a receiver has exited an indoor location to an outdoor location. Following this approach is helpful when the changes for most, if not all beacons, are in the same direction (e.g., strong to weak, or weak to strong).

Alternatively, either the strong to weak change or the weak to strong change could indicate a receiver has remained indoors since it is likely that signals from certain satellites passed through rooftops at one moment in time when the signal strength is low, and then through a window at a different moment in time when the signal strength is higher. Following this approach is helpful when the changes for different beacons are not in the same direction (e.g., some signal strengths change from strong to weak, while other signal strengths change from weak to strong).

Drastic changes can be compared to sensed movement of the receiver (e.g., measured movement via inertial sensors), such that sensed movement of the receiver is believed to have caused the change (e.g., movement in or out of a building, movement towards or away from building material that more drastically or less drastically affects signal strength). Alternatively, if little or no movement of the receiver is sensed, the change is believed to have been caused by the movement of the beacon (e.g., where the beacon was obscured from view behind a thick concrete wall of a building and is now in view of a thin glass window). Also, if little or no movement is determined for an extended period of time (e.g., during normal business hours), it may be assumed that the receiver is indoors.

Use of a median signal strength may also result in consideration of certain beacons associated with signal strengths that are below the individual signal strength threshold, but are otherwise strong enough over time.

Estimating if a Receiver is Indoors or Outdoors Based on Pressure Measurement(s)

Additional embodiments consider measurement(s) of pressure (also referred to as "pressure measurements") when determining whether a receiver is indoors or outdoors. Pressure is useful because it relates to altitude such that the pressure at one altitude is typically different than the pressure at another altitude in the same geographic area. For example, a receiver typically measures decreasing pressures as it ascends up floors of a building in an elevator. Thus, pressure measurement(s) taken at location(s) of a receiver can be used to estimate whether the receiver is indoors or outdoors.

Certain embodiments also consider reference pressure measurements from pressure sensors at reference locations in the geographical area within which the receiver resides. Such reference pressure measurements can be transmitted to the receiver (or a backend server) for determining whether the receiver is indoors or outdoors. Transmission of the reference pressure measurements may be made via any suitable communication link (e.g., a radio link or other wireless link, and/or a wired link). Additional details regarding these different embodiments are described below.

In one embodiment, pressure measurements taken at different locations of the receiver can be tracked over time. As successive pressure measurements change, an estimate of the receiver's location (i.e., indoors or outdoors) can be determined.

For example, where changes to latitude and longitude of the receiver are within known boundaries over time, but measurements of pressure are changing over time, then the receiver is likely moving upward in a building (i.e., the receiver is indoors) or downward in a building (i.e., the receiver is on a lower floor of a building or exiting the building). In one embodiment, changes to latitude and longitude that are within known boundaries include no changes, or include changes that occur within an area with an outdoor ground level that has generally the same altitude throughout. If the measurements of pressure are decreasing, then the estimate of the receiver's location is indoors. However, if the measurements of pressure are increasing, then the receiver may still be indoors or may be outdoors. In such cases, additional analysis may be needed as described below.

In one embodiment, additional analysis for determining if the receiver is still indoors or if the receiver is outdoors involves a comparison of the latest pressure measurement with reference pressure measurement(s) take at different altitude(s). If the latest pressure measurement and a reference pressure measurement match (e.g., are within a threshold amount of pressure like 10 Pascals or less), then it may be determined that the altitude corresponding to the matching reference pressure measurement is an acceptable estimate of the receiver's altitude. Once an acceptable estimate of the receiver's altitude is determined, then that altitude can be compared to an altitude of outdoor areas in the vicinity of the receiver's known geographic area, or in the vicinity of the receiver's estimated latitude and longitude. If the estimated altitude of the receiver is different than the altitude of the outdoor areas by a threshold amount of altitude (e.g., at least 2 meters), the receiver is considered to be indoors. If the estimated altitude of the receiver and the altitude of the outdoor areas are within a threshold amount of altitude (e.g., within 2 meters), the receiver is considered to be outdoors.

Alternatively, the receiver's estimated altitude can be compared to altitudes of building floors in the vicinity of the receiver to determine if the estimated altitude of the receiver is different than the altitude of each floor (i.e., the receiver is outdoors), or if the estimated altitude of the receiver and the altitude of a floor are within a threshold amount of altitude (i.e., the receiver is indoors). In the case where the receiver's estimated altitude matches the ground floor of the building, the position of the receiver may be estimated as outdoors (since most ground floors of tall buildings are used as entry and exit points), or additional considerations like signal strength, azimuthal angles and/or elevation angles may be consulted as described previously in this disclosure to determine if the receiver has exited or entered the building.

In another embodiment, additional analysis for determining if the receiver is still indoors or if the receiver is outdoors involves determining an amount of change between two pressure measurements. If the original location of the receiver is known to be a particular floor of a building, the amount of pressure change among pressure measurements of the receiver can be used to estimate a vertical distance traveled by the receiver. For example, a pressure change of 30 Pascals may relate to a vertical distance of 3 meters, and 3 meters may relate to the height of a floor in a building. Once estimated, the estimated vertical distance can be used to determine if the receiver's latest pressure measurement corresponds to the ground floor of a building. For example, if the receiver was on a floor that is 9 meters above a ground floor, and the change in pressure is 90 Pascals, then it is likely that the receiver descended to the ground floor and is exiting the building—i.e., therefore the estimated position is outdoors.

In one embodiment, latitude and longitude is estimated, and the estimated latitude and longitude are used to look up an altitude of an outdoor area corresponding to the estimated latitude and longitude. That altitude may be compared to an estimated altitude of the receiver. If the altitudes differ by a threshold amount (e.g., at least 2 meters), then the receiver is considered to be indoors. Otherwise, if the estimated pressure and the pressure measurement do not differ by the threshold amount, then the receiver is considered to be outdoors.

Alternatively, an estimated pressure corresponding to that altitude may be determined and compared against a pressure measurement from the receiver. If the estimated pressure and the pressure measurement differ by a threshold amount (e.g., 10 Pascals or other), then the receiver is considered to be indoors. Otherwise, if the estimated pressure and the pressure measurement do not differ by the threshold amount, then the receiver is considered to be outdoors.

In one embodiment, latitude and longitude are not used. Instead, a pressure measurement from the receiver may be compared to one or more predefined levels of pressure. If the pressure measurement matches a predefined level of pressure corresponding to an outdoor location, then the estimated position of the receiver is outdoors. Otherwise, the estimated position is indoors. Alternatively, if the pressure measurement matches a predefined level of pressure corresponding to an indoor location, then the estimated position of the receiver is indoors. Otherwise, the estimated position is outdoors. The predefined levels of pressure may be determined using various approaches. For example, historical pressure measurements may be used (e.g., average pressures for the particular time of the year, or many other approaches for determining a suitable level of pressure).

As previously mentioned, reference pressure measurements may be compared to a pressure measurement from the receiver. Such reference pressure measurements may be determined at reference pressure sensors in a geographic area within which the receiver resides. By way of example, U.S. Ser. No. 13/296,067, filed Nov. 14, 2011, and entitled WIDE AREA POSITIONING SYSTEM, describes a suitable system that provides one type of reference pressure measurement that may be compared to a pressure measurement from a receiver.

Evaluation of the Indoors/Outdoors Estimate

In addition to using satellite position and signal strength measurements to aid in estimating an indoor or outdoor location of a receiver, range residues of visible satellites may be used to determine the quality of previous measurements. Given an estimated position for the receiver, the range residue of a satellite is defined as the difference between the estimated range of that satellite from an estimated position of a receiver and its measured range. In addition to the measurements defined in the previous section, the receiver can also collect measurements of the range residues of satellites across time. These measurements can then be used to evaluate the initial estimate of the receiver's location. For example, assume that based on the azimuth, elevation and signal strength measurements, the receiver estimated that it was outdoors. However, if the range residue statistics across satellites across time do not satisfy predetermined criteria, the receiver may reverse its estimation and declare that it is indoors. Various predetermined criteria are contemplated, including such criteria that require range residuals to have a zero mean or close to zero mean spread (e.g., a percentage of total possible spread). In some embodiments, a large bias indicates multipath from a beacon. If multiple beacons have heavy multipath, the receiver can be thought to be indoors for range weighting purposes even though it may be physically outdoor.

Thus, a change of estimated location from outdoors to indoors may imply that measurements (e.g., range measurements) associated with the satellite signals are less reliable than originally believed, and should be given a lower weight during trilateration. The opposite is also true, where the estimated position is changed from indoors to outdoors, which may imply that the measurements (e.g., range measurements) associated with the satellite signals are more reliable than originally believed, and should be given a higher weight during trilateration. In a hybridization scenario, other terrestrial constellations can be weighed higher than the low quality satellite measurements, or vice versa.

Use of Indoors/Outdoors Estimate to Weigh Positioning Information

The "indoors"/"outdoors" estimate of the receiver's location can be used to determine which of several positioning approaches (e.g., use of a satellite positioning system, a terrestrial positioning system, or a hybrid positioning system) is more likely to produce the most-accurate positioning information for use during trilateration. The positioning approach that is more likely to produce the most-accurate positioning information may then be selected, or the positioning information for that approach may be given a greater weight during trilateration processing. Of course, the opposite is true, where a positioning approach (or its positioning information) that is less likely to produce the most-accurate positioning information, or that is more likely to produce less-accurate positioning information, is given less weight during trilateration processing.

For instance, a satellite positioning approach may be considered as more accurate than a terrestrial positioning approach when the receiver is believed to be outdoors. The opposite may be true when the receiver is believed to be indoors. Two terrestrial systems may be similarly evaluated, where a first positioning approach that uses range measurements to a first network of terrestrial beacons may be considered as more accurate than a second positioning approach that uses range measurements to a second network of terrestrial beacons when the receiver is believed to be outdoors, and the opposite is true when the receiver is believed to be indoors.

In some cases, the signal strength measured inside (e.g., behind a window) will be very similar to the signal strength measured outside, and such locations might be declared as "outdoors". While the "outdoors" estimation may be inaccurate as to the actual position of the receiver, such an "outdoors" estimation can be interpreted as meaning that beacon measurements are of good quality and should be weighed more than less quality signals during trilateration or other processing.

Other Embodiments

Functionality and operation disclosed herein may be embodied as one or more methods implemented, in whole or in part, by machine(s)—e.g., processor(s)—at one or more locations. Non-transitory machine-readable media embodying program instructions adapted to be executed to implement the method(s) are also contemplated. Execution of the program instructions by one or more processors cause the processors to carry out the method(s).

By way of example, not by way of limitation, method(s) may comprise: identifying data associated with a plurality of beacons, wherein the data includes, for each of the beacons, one or more of (i) data relating to an azimuthal angle corresponding to a position of that beacon, (ii) data relating to an elevation angle corresponding to the position of that beacon, and (iii) data relating to a signal strength corresponding to that beacon; and evaluating the data based on one or more predetermined conditions to estimate whether a receiver is indoors or outdoors.

In accordance with some aspects, the data specifies, for each of the beacons, (i) the azimuthal angle corresponding to the position of that beacon, (ii) the elevation angle corresponding to the position of that beacon, and (iii) the signal strength corresponding to that beacon. Method(s) may further or alternatively comprise: estimating whether the receiver is indoors or outdoors based on (i) whether the azimuthal angles corresponding to the beacons meet an azimuthal angle condition, (ii) whether the elevation angles corresponding to the beacons meet an elevation angle condition, and (iii) whether the signal strengths corresponding to the beacons meet a signal strength condition.

In accordance with some aspects, the azimuthal angle condition specifies that each of n azimuthal angle ranges must include a predetermined number of the azimuthal angles corresponding to the beacons, wherein the elevation angle condition specifies that each of m elevation angle ranges must include a predetermined number of the elevation angles corresponding to the beacons, and wherein the signal strength condition specifies that each of the signal strengths exceed a minimum signal strength threshold value.

In accordance with some aspects, the azimuthal angle condition specifies that each of n azimuthal angle ranges must include a predetermined number of the azimuthal angles corresponding to the beacons, wherein the elevation angle condition specifies that each of m elevation angle ranges must include a predetermined number of the elevation angles corresponding to the beacons, and wherein the signal strength condition specifies that each of a plurality of median signal strengths exceed a median signal strength threshold value, wherein each of the plurality of median signal strengths corresponds to a different beacon from the plurality of beacons, and wherein each of the plurality of median signal strengths is based on two or more signal strengths measured for two or more signals that were transmitted by that different beacon during a time period.

In accordance with some aspects, the azimuthal angle condition specifies that each of the azimuthal angles corresponding to the beacons must be separated from each other by at least a first amount of angular separation, wherein the elevation angle condition specifies that each of the elevation angles corresponding to the beacons must be separated from each other by at least a second amount of angular separation, and wherein the signal strength condition specifies that each of the signal strengths must exceed a minimum signal strength threshold value.

In accordance with some aspects, the azimuthal angle condition specifies that each of the azimuthal angles corresponding to the beacons must be separated from each other by at least a first amount of angular separation, wherein the elevation angle condition specifies that each of the elevation angles corresponding to the beacons must be separated from each other by at least a second amount of angular separation, and wherein the signal strength condition specifies that each of a plurality of median signal strengths exceed a median signal strength threshold value, wherein each of the plurality of median signal strengths corresponds to a different beacon from the plurality of beacons, and wherein each of the plurality of median signal strengths is based on two or more signal strengths measured for two or more signals that were transmitted by that different beacon during a time period.

Method(s) may further or alternatively comprise: estimating that the receiver is indoors when each of at least n azimuthal angle ranges do not include a predetermined number of the azimuthal angles corresponding to the beacons, when each of at least m elevation angle ranges do not include a predetermined number of the elevation angles corresponding to the beacons, or when a predetermined number of the signal strengths do not exceed a minimum signal strength threshold value.

Method(s) may further or alternatively comprise: determining, for each of the beacons, a median signal strength based on two or more signal strengths measured for two or more signals that were transmitted by that beacon; and estimating that the receiver is indoors when each of at least n azimuthal angle ranges do not include a predetermined number of the azimuthal angles corresponding to the beacons, when each of at least m elevation angle ranges do not include a predetermined number of the elevation angles corresponding to the beacons, or when a predetermined number of the median signal strengths do not exceed a median signal strength threshold value.

Method(s) may further or alternatively comprise: estimating that the receiver is indoors when a predetermined number of the azimuthal angles corresponding to the beacons are not separated from each other by at least a first amount of angular separation, when a predetermined number of the elevation angles corresponding to the beacons are not separated from each other by at least a second amount of angular separation, or when a predetermined number of the signal strengths do not exceed a minimum signal strength threshold value.

Method(s) may further or alternatively comprise: determining, for each of the beacons, a median signal strength based on two or more signal strengths measured for two or more signals that were transmitted by that beacon; and estimating that the receiver is indoors when a predetermined number of the azimuthal angles corresponding to the beacons are not separated from each other by at least a first amount of angular separation, when a predetermined number of the elevation angles corresponding to the beacons are not separated from each other by at least a second amount of angular separation, or when a predetermined number of the median signal strengths do not exceed a median signal strength threshold value.

Method(s) may further or alternatively comprise: estimating that the receiver is outdoors when each of n azimuthal angle ranges include a predetermined number of the azimuthal angles corresponding to the beacons, when each of m elevation angle ranges include a predetermined number of the elevation angles corresponding to the beacons, and when a predetermined number of the signal strengths exceed a minimum signal strength threshold value.

Method(s) may further or alternatively comprise: determining, for each of the beacons, a median signal strength based on two or more signal strengths measured for two or more signals that were transmitted by that beacon; and estimating that the receiver is outdoors when each of n azimuthal angle ranges include a predetermined number of the azimuthal angles corresponding to the beacons, when each of m elevation angle ranges include a predetermined number of the elevation angles corresponding to the beacons, and when a predetermined number of the median signal strengths exceed a median signal strength threshold value.

Method(s) may further or alternatively comprise: estimating that the receiver is outdoors when each of the azimuthal angles corresponding to the beacons are separated from each other by at least a first amount of angular separation, when each of the elevation angles corresponding to the beacons are separated from each other by at least a second amount of angular separation, and when a predetermined number of the signal strengths exceed a minimum signal strength threshold value.

Method(s) may further or alternatively comprise: determining, for each of the beacons, a median signal strength based on two or more signal strengths measured for two or more signals that were transmitted by that beacon; and estimating that the receiver is outdoors when each of the azimuthal angles corresponding to the beacons are separated from each other by at least a first amount of angular separation, when each of the elevation angles corresponding to the beacons are separated from each other by at least a second amount of angular separation, and when a predetermined number of the median signal strengths exceed a median signal strength threshold value.

In accordance with some aspects, the number of measured signal strengths or measured median signal strengths may be a percentage of a total number of the measured signal strengths or measured median signal strengths that each correspond to a different satellite of recently or currently "in view" satellites from which signals are received. The predetermined number may be, for example, 50%. Of course, other numbers are contemplated, including any number between 0 and 100%.

In accordance with some aspects, the data includes, for each of the beacons, an azimuthal angle corresponding to the position of that beacon.

Method(s) may further or alternatively comprise: estimating whether the receiver is indoors or outdoors based on whether the azimuthal angles corresponding to the beacons meet an azimuthal angle condition.

In accordance with some aspects, the azimuthal angle condition specifies that each of the azimuthal angles corresponding to the beacons must be separated from each other by at least a first amount of angular separation.

In accordance with some aspects, the number of beacons is 6 to 12, and wherein the first amount of angular separation is between 30 and 60 degrees.

In accordance with some aspects, the azimuthal angle condition specifies that each of n azimuthal angle ranges must include a predetermined number of the azimuthal angles corresponding to the beacons.

In accordance with some aspects, n equals 6 to 12, and wherein each of the n azimuthal ranges do not overlap by more than 10 degrees.

In accordance with some aspects, n equals 6 to 12, wherein the sizes of each azimuthal angle range are between 30 and 60 degrees, and wherein the predetermined number is 1 or more.

Method(s) may further or alternatively comprise: estimating that the receiver is indoors when the azimuthal angles corresponding to the beacons are not separated from each other by at least a first amount of angular separation.

In accordance with some aspects, the first amount of angular separation is 30 degrees of angular separation.

Method(s) may further or alternatively comprise: estimating that the receiver is indoors when each of at least n azimuthal angle ranges do not include a predetermined number of the azimuthal angles corresponding to the beacons.

Method(s) may further or alternatively comprise: estimating that the receiver is outdoors when each of the azimuthal angles corresponding to the beacons are separated from each other by at least a first amount of angular separation.

Method(s) may further or alternatively comprise: estimating that the receiver is outdoors when each of n azimuthal angle ranges include a predetermined number of the azimuthal angles corresponding to the beacons.

In accordance with some aspects, the data includes, for each of the beacons, an elevation angle corresponding to the position of that beacon. Method(s) may further or alternatively comprise: estimating whether the receiver is indoors or outdoors based on whether the elevation angles corresponding to the beacons meet an elevation angle condition.

In accordance with some aspects, the elevation angle condition specifies that each of the elevation angles corresponding to the beacons must be separated from each other by at least a second amount of angular separation.

In accordance with some aspects, the second amount of angular separation is 15 degrees of angular separation.

In accordance with some aspects, the elevation angle condition specifies that each of m elevation angle ranges must include a predetermined number of the elevation angles corresponding to the beacons.

In accordance with some aspects, each of the m elevation ranges do not overlap by more than 5 degrees.

In accordance with some aspects, the sizes of each elevation angle range are at least 15 degrees.

Method(s) may further or alternatively comprise: estimating that the receiver is indoors when the elevation angles corresponding to the beacons are not separated from each other by at least a second amount of angular separation.

Method(s) may further or alternatively comprise: estimating that the receiver is indoors when each of at least m elevation angle ranges do not include a predetermined number of the elevation angles corresponding to the beacons.

Method(s) may further or alternatively comprise: estimating that the receiver is outdoors when each of the elevation angles corresponding to the beacons are separated from each other by at least a second amount of angular separation.

Method(s) may further or alternatively comprise: estimating that the receiver is outdoors when each of m elevation angle ranges include a predetermined number of the elevation angles corresponding to the beacons.

In accordance with some aspects, the data includes, for each of the beacons, the signal strength corresponding to that beacon. Method(s) may further or alternatively comprise: estimating whether the receiver is indoors or outdoors based on whether the signal strengths corresponding to the beacons meet a signal strength condition.

In accordance with some aspects, the signal strength condition specifies that each of the signal strengths must exceed a minimum signal strength threshold value.

In accordance with some aspects, the signal strength condition specifies that each of a plurality of median signal strengths exceed a median signal strength threshold value, wherein each of the plurality of median signal strengths corresponds to a different beacon from the plurality of beacons, and wherein each of the plurality of median signal strengths is based on two or more signal strengths measured for two or more signals that were transmitted by that different beacon during a time period.

Method(s) may further or alternatively comprise: estimating that the receiver is indoors when each of the signal strengths do not exceed a minimum signal strength threshold value.

Method(s) may further or alternatively comprise: determining, for each of the beacons, a median value of two or more signal strengths corresponding to that beacon; and estimating that the receiver is indoors when each of the median values do not exceed a median signal strength threshold value.

Method(s) may further or alternatively comprise: estimating that the receiver is outdoors when each of the signal strengths exceed a minimum signal strength threshold value.

Method(s) may further or alternatively comprise: determining, for each of the beacons, a median value of two or more signal strengths corresponding to that beacon; and estimating that the receiver is outdoors when each of the median values exceed a median signal strength threshold value.

Method(s) may further or alternatively comprise: using one or more estimated ranges between the receiver and one or more of the beacons to confirm or reject the estimate of whether the receiver is indoors or outdoors.

Method(s) may further or alternatively comprise: determining one or more differences between the one or more estimated ranges and one or more measured ranges between the receiver and the one or more beacons; and using the one or more differences to confirm or reject the estimate of whether the receiver is indoors or outdoors.

By way of example, not by way of limitation, method(s) may comprise: identifying data associated with a plurality of beacons, wherein the data includes, for each of the beacons, one or more metrics corresponding to that beacon; and evaluating the one or more metrics based on one or more metric conditions to estimate whether a receiver is indoors or outdoors.

An output from one system may cause another system to perform a method even if intervening steps occur between the output and performance of the method.

The illustrative methods described herein may be implemented, performed, or otherwise controlled by suitable hardware known or later-developed by one of ordinary skill in the art, or by firmware or software executed by processor (s), or any combination of hardware, software and firmware. Software may be downloadable and non-downloadable at a particular system.

Systems on which methods described herein are performed may include one or more means that implement those methods. For example, such means may include processor(s) or other hardware that, when executing instructions (e.g., embodied in software or firmware), perform any method step disclosed herein. A processor may include, or be included within, a computer or computing device, a controller, an integrated circuit, a "chip", a system on a chip, a server, other programmable logic devices, other circuitry, or any combination thereof.

"Memory" may be accessible by a machine (e.g., a processor), such that the machine can read/write information from/to the memory. Memory may be integral with or separate from the machine. Memory may include a non-transitory machine-readable medium having machine-readable program code (e.g., instructions) embodied therein that is adapted to be executed to implement each of the methods and method steps disclosed herein. Memory may include any available storage media, including removable, non-removable, volatile, and non-volatile media—e.g., integrated circuit media, magnetic storage media, optical storage media, or any other computer data storage media. As used herein, machine-readable media includes all forms of machine-readable media except to the extent that such media is deemed to be non-statutory (e.g., transitory propagating signals).

Application programs may carry out aspects by receiving, converting, processing, storing, retrieving, transferring and/or exporting data, which may be stored in a hierarchical, network, relational, non-relational, object-oriented, or other data source. A data source may be a single storage device or realized by multiple (e.g., distributed) storage devices.

All of the information disclosed herein may be represented by data, and that data may be transmitted over any communication pathway using any protocol, stored on a data source, and processed by a processor. For example, transmission of data may be carried out using a variety of wires, cables, radio signals and infrared light beams, and an even greater variety of connectors, plugs and protocols even if not shown or explicitly described. Systems described herein may exchange information with each other (and with other systems that are not described) using any known or later-developed communication technology, including WiFi, Bluetooth, NFC and other communication network technologies. Carrier waves may be used to transfer data and instructions through electronic, optical, air, electromagnetic, RF, or other signaling media over a network using network transfer protocols. Data, instructions, commands, information, signals, bits, symbols, and chips disclosed herein may be represented by voltages, currents, electromagnetic waves, magnetic fields or particles, optical fields or particles, or any combination thereof.

By way of example, as used herein, a geographic area may be defined by a neighborhood, a city, a county, a region, a service area, or other area. It is note that different systems disclosed herein may be geographically dispersed from one another in different geographic areas such that different method steps are performed in different regions and by different systems.

Features in system figures that are illustrated as rectangles may refer to hardware, firmware or software, each of which may comprise a component of a device. It is noted that lines linking two such features may be illustrative of data transfer between those features. Such transfer may occur directly between those features or through intermediate features even if not illustrated. Where no line connects two features, transfer of data between those features is contemplated unless otherwise stated. Thus, such lines are provided to illustrate certain aspects, but should not be interpreted as limiting. The words comprise, comprising, include, including and the like are to be construed in an inclusive sense (i.e., not limited to) as opposed to an exclusive sense (i.e., consisting only of). Words using the singular or plural number also include the plural or singular number, respectively. The words or or and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment. This disclosure is not intended to be limited to the aspects shown herein but is to be accorded the widest scope understood by a skilled artisan, including equivalents.

It is noted that the term "GPS" may refer to any Global Navigation Satellite Systems (GNSS), such as GLONASS, Galileo, and Compass/Beidou, and vice versa.

Various techniques are used to estimate the position of a receiver, including trilateration, which is the process of using geometry to estimate the position using distances traveled by different "ranging" signals that are received by the receiver from different beacons (e.g., transmitters, satellites, antennas). If the transmission and reception times of a ranging signal are known, then the difference between those times multiplied by speed of light would provide an estimate of the distance traveled by that ranging signal. These estimates are often referred to as "range" measurements. Approaches for estimating the position of a receiver based on signaling from transmitters are described in co-assigned U.S. Pat. No. 8,130,141, issued Mar. 6, 2012, and U.S. patent application Ser. No. 13/296,067, filed Nov. 14, 2011, which are incorporated herein in their entirety and for all purposes, except where their content conflicts with the content of this disclosure.

Related Applications

This application relates to U.S. Patent Application Ser. No. 62/019,745, filed Jul. 1, 2014, entitled SYSTEMS AND METHODS FOR ESTIMATING WHETHER A RECEIVER IS INSIDE OR OUTSIDE A BUILDING, the content of which is hereby incorporated by reference herein in its entirety.

The invention claimed is:

1. A method for estimating whether a receiver is indoors or outdoors, wherein the method comprises:
determining data associated with a plurality of beacons that specifies, for each of the beacons, (i) an azimuthal angle corresponding to the position of that beacon, (ii) an elevation angle corresponding to the position of that beacon, and (iii) a signal strength corresponding to that beacon;
determining that (i) any azimuthal angle range of n azimuthal angle ranges does not include a predetermined number of azimuthal angles from the azimuthal angles corresponding to the beacons, any elevation angle range of m elevation angle ranges does not include a predetermined number of elevation angles from the elevation angles corresponding to the beacons, or any signal strength of the signal strengths does not exceed a minimum signal strength threshold value, or (ii) each azimuthal angle range of the n azimuthal angle ranges includes the predetermined number of azimuthal angles from the azimuthal angles corresponding to the beacons, each elevation angle range of the m elevation angle ranges includes the predetermined number of elevation angles from the elevation angles corresponding to the beacons, and the signal strengths exceed the minimum signal strength threshold value; and estimating, using one or more processors, whether the receiver is indoors or outdoors based on (i) whether the azimuthal angles corresponding to the beacons meet an azimuthal angle condition, (ii) whether the elevation angles corresponding to the beacons meet an elevation angle condition, and (iii) whether the signal strengths corresponding to the beacons meet a signal strength condition by:

estimating that the receiver is indoors after determining that any azimuthal angle range of n azimuthal angle ranges does not include the predetermined number of azimuthal angles from the azimuthal angles corresponding to the beacons, any elevation angle range of m elevation angle ranges does not include the predetermined number of elevation angles from the elevation angles corresponding to the beacons, or any signal strength of the signal strengths does not exceed the minimum signal strength threshold value; and estimating that the receiver is outdoors after determining that each azimuthal angle range of the n azimuthal angle ranges includes the predetermined number of azimuthal angles from the azimuthal angles corresponding to the beacons, each elevation angle range of the m elevation angle ranges includes the predetermined number of elevation angles from the elevation angles corresponding to the beacons, and the signal strengths exceed the minimum signal strength threshold value.

2. The method of claim 1, wherein the method comprises:
determining, for each of the beacons, a median signal strength based on two or more signal strengths measured for two or more signals that were transmitted by that beacon,
wherein the data specifying, for each of the beacons, the signal strength corresponding to that beacon is the median signal strength for that beacon,
wherein the minimum signal strength threshold value is a median signal strength threshold value,
wherein the receiver is estimated to be indoors when any azimuthal angle range of the n azimuthal angle ranges does not include the predetermined number of azimuthal angles from the azimuthal angles corresponding to the beacons, when any elevation angle range of the m elevation angle ranges does not include the predetermined number of elevation angles from the elevation angles corresponding to the beacons, or when any median signal strength of the median signal strengths corresponding to the beacons does not exceed the median signal strength threshold value; and
wherein the receiver is estimated to be outdoors when each azimuthal angle range of the n azimuthal angle ranges includes the predetermined number of azimuthal angles from the azimuthal angles corresponding to the beacons, when each elevation angle range of the m elevation angle ranges includes the predetermined number of elevation angles from the elevation angles corresponding to the beacons, and when the median signal strengths corresponding to the beacons exceed the median signal strength threshold value.

3. The method of claim 1, wherein the beacons are satellites.

4. The method of claim 1, wherein the beacons are terrestrial transmitters.

5. The method of claim 1, wherein n is at least four, and m is at least four.

6. A method for estimating whether a receiver is indoors or outdoors, the method comprising:
determining data associated with a plurality of beacons that specifies, for each of the beacons, an azimuthal angle corresponding to the position of that beacon;
determining that (i) each of the azimuthal angles corresponding to the beacons are separated from each other by at least 30 degrees of angular separation, or two or more of the azimuthal angles corresponding to the beacons are not separated from each other by at least 30 degrees of angular separation, wherein the beacons include at least six beacons, or (ii) each azimuthal angle range of n azimuthal angle ranges includes at least one of the azimuthal angles corresponding to the beacons, or any azimuthal angle range of the n azimuthal angle ranges does not include at least one of the azimuthal angles corresponding to the beacons, wherein n is at least four, and wherein none of the azimuthal angle ranges from the n azimuthal angle ranges overlap with each other by more than ten degrees; and
estimating, using one or more processors, whether the receiver is indoors or outdoors based on whether the azimuthal angles corresponding to the beacons meet an azimuthal angle condition by:
estimating that the receiver is outdoors after determining that each of the azimuthal angles corresponding to the beacons are separated from each other by at least 30 degrees of angular separation, and estimating that the receiver is indoors after determining that two or more of the azimuthal angles corresponding to the beacons are not separated from each other by at least 30 degrees of angular separation; or
estimating that the receiver is outdoors after determining that each azimuthal angle range of n azimuthal angle ranges includes at least one of the azimuthal angles corresponding to the beacons, and estimating that the receiver is indoors after determining that any azimuthal angle range of the n azimuthal angle ranges does not include at least one of the azimuthal angles corresponding to the beacons.

7. The method of claim 6, wherein the azimuthal angle condition specifies that each of the azimuthal angles corresponding to the beacons must be separated from each other by at least 30 degrees of angular separation, wherein the beacons include at least six beacons, and wherein the method comprises:
estimating that the receiver is indoors when two or more of the azimuthal angles corresponding to the beacons are not separated from each other by at least 30 degrees of angular separation; and
estimating that the receiver is outdoors when each of the azimuthal angles corresponding to the beacons are separated from each other by at least 30 degrees of angular separation.

8. The method of claim 6, wherein the azimuthal angle condition specifies that each azimuthal angle range of n azimuthal angle ranges must include at least one of the azimuthal angles corresponding to the beacons, wherein n is at least four, and wherein none of the azimuthal angle ranges from the n azimuthal angle ranges overlap with each other by more than ten degrees, and wherein the method comprises:
    estimating that the receiver is indoors when any azimuthal angle range of the n azimuthal angle ranges does not include at least one of the azimuthal angles corresponding to the beacons; and
    estimating that the receiver is outdoors when each azimuthal angle range of the n azimuthal angle ranges includes at least one of the azimuthal angles corresponding to the beacons.

9. The method of claim 8, wherein the beacons are satellites.

10. The method of claim 8, wherein the beacons are terrestrial transmitters.

11. The method of claim 8, wherein n is at least six.

12. A method for estimating whether a receiver is indoors or outdoors, the method comprising:
    determining data associated with a plurality of beacons that specifies, for each of the beacons, an elevation angle corresponding to the position of that beacon;
    determining that (i) each of the elevation angles corresponding to the beacons are separated from each other by at least 15 degrees of angular separation, or two or more of the elevation angles corresponding to the beacons are not separated from each other by at least 15 degrees of angular separation, or (ii) each elevation angle range of m elevation angle ranges includes at least one of the elevation angles corresponding to the beacons, or any elevation angle range of the m elevation angle ranges does not include at least one of the elevation angles corresponding to the beacons, wherein none of the elevation angle ranges from the m elevation angle ranges overlap with each other by more than five degrees; and
    estimating, using the one or more processors, whether the receiver is indoors or outdoors based on whether the elevation angles corresponding to the beacons meet an elevation angle condition by:
        estimating that the receiver is outdoors after determining that each of the elevation angles corresponding to the beacons are separated from each other by at least 15 degrees of angular separation, and estimating that the receiver is indoors after determining two or more of the elevation angles corresponding to the beacons are not separated from each other by at least 15 degrees of angular separation; or
        estimating that the receiver is outdoors after determining the elevation angle condition specifies that each elevation angle range of m elevation angle ranges includes at least one of the elevation angles corresponding to the beacons, and estimating that the receiver is indoors when any elevation angle range of the m elevation angle ranges does not include at least one of the elevation angles corresponding to the beacons.

13. The method of claim 12, wherein the elevation angle condition specifies that each of the elevation angles corresponding to the beacons must be separated from each other by at least 15 degrees of angular separation, and wherein the method comprises:
    estimating that the receiver is indoors when two or more of the elevation angles corresponding to the beacons are not separated from each other by at least 15 degrees of angular separation; and
    estimating that the receiver is outdoors when each of the elevation angles corresponding to the beacons are separated from each other by at least 15 degrees of angular separation.

14. The method of claim 12, wherein the elevation angle condition specifies that each elevation angle range of m elevation angle ranges must include at least one of the elevation angles corresponding to the beacons, wherein none of the elevation angle ranges from the m elevation angle ranges overlap with each other by more than five degrees, and wherein the method comprises:
    estimating that the receiver is indoors when any elevation angle range of the m elevation angle ranges does not include at least one of the elevation angles corresponding to the beacons; and
    estimating that the receiver is outdoors when each elevation angle range of the m elevation angle ranges includes at least one of the elevation angles corresponding to the beacons.

15. The method of claim 14, wherein the beacons are satellites.

16. The method of claim 14, wherein the beacons are terrestrial transmitters.

17. The method of claim 14, wherein m is at least four.

18. One or more non-transitory processor-readable media embodying program instructions that, when executed by one or more processors, cause the one or more processors to implement a method for estimating whether a receiver is indoors or outdoors, the method comprising:
    determining data associated with a plurality of beacons that specifies, for each of the beacons, an azimuthal angle corresponding to the position of that beacon;
    determining that (i) each of the azimuthal angles corresponding to the beacons are separated from each other by at least 30 degrees of angular separation, or two or more of the azimuthal angles corresponding to the beacons are not separated from each other by at least 30 degrees of angular separation, wherein the beacons include at least six beacons, or (ii) each azimuthal angle range of n azimuthal angle ranges includes at least one of the azimuthal angles corresponding to the beacons, or any azimuthal angle range of the n azimuthal angle ranges does not include at least one of the azimuthal angles corresponding to the beacons, wherein n is at least four, and wherein none of the azimuthal angle ranges from the n azimuthal angle ranges overlap with each other by more than ten degrees; and
    estimating whether the receiver is indoors or outdoors based on whether the azimuthal angles corresponding to the beacons meet an azimuthal angle condition by:
        estimating that the receiver is outdoors after determining that each of the azimuthal angles corresponding to the beacons are separated from each other by at least 30 degrees of angular separation, and estimating that the receiver is indoors after determining that two or more of the azimuthal angles corresponding to the beacons are not separated from each other by at least 30 degrees of angular separation; or
        estimating that the receiver is outdoors after determining that each azimuthal angle range of n azimuthal angle ranges includes at least one of the azimuthal angles corresponding to the beacons, and estimating that the receiver is indoors after determining that any azimuthal angle range of the n azimuthal angle ranges does not include at least one of the azimuthal angles corresponding to the beacons.

19. The one or more non-transitory processor-readable media of claim 18, wherein the azimuthal angle condition specifies that each of the azimuthal angles corresponding to the beacons must be separated from each other by at least 30 degrees of angular separation, wherein the beacons include at least six beacons, and wherein the method comprises:
estimating that the receiver is indoors when two or more of the azimuthal angles corresponding to the beacons are not separated from each other by at least 30 degrees of angular separation; and
estimating that the receiver is outdoors when each of the azimuthal angles corresponding to the beacons are separated from each other by at least 30 degrees of angular separation.

20. The one or more non-transitory processor-readable media of claim 18, wherein the azimuthal angle condition specifies that each azimuthal angle range of n azimuthal angle ranges must include at least one of the azimuthal angles corresponding to the beacons, wherein n is at least four, and wherein none of the azimuthal angle ranges from the n azimuthal angle ranges overlap with each other by more than ten degrees, and wherein the method comprises:
estimating that the receiver is indoors when any azimuthal angle range of the n azimuthal angle ranges does not include at least one of the azimuthal angles corresponding to the beacons; and
estimating that the receiver is outdoors when each azimuthal angle range of the n azimuthal angle ranges includes at least one of the azimuthal angles corresponding to the beacons.

21. The one or more non-transitory processor-readable media of claim 20, wherein the beacons are satellites.

22. The one or more non-transitory processor-readable media of claim 20, wherein the beacons are terrestrial transmitters.

23. The one or more non-transitory processor-readable media of claim 20, wherein n is at least six.

24. One or more non-transitory processor-readable media embodying program instructions that, when executed by one or more processors, cause the one or more processors to implement a method for estimating whether a receiver is indoors or outdoors, the method comprising:
determining data associated with a plurality of beacons that specifies, for each of the beacons, an elevation angle corresponding to the position of that beacon;
determining that (i) each of the elevation angles corresponding to the beacons are separated from each other by at least 15 degrees of angular separation, or two or more of the elevation angles corresponding to the beacons are not separated from each other by at least 15 degrees of angular separation, or (ii) each elevation angle range of m elevation angle ranges includes at least one of the elevation angles corresponding to the beacons, or any elevation angle range of the m elevation angle ranges does not include at least one of the elevation angles corresponding to the beacons, wherein none of the elevation angle ranges from the m elevation angle ranges overlap with each other by more than five degrees; and
estimating whether the receiver is indoors or outdoors based on whether the elevation angles corresponding to the beacons meet an elevation angle condition by:
estimating that the receiver is outdoors after determining that each of the elevation angles corresponding to the beacons are separated from each other by at least 15 degrees of angular separation, and estimating that the receiver is indoors after determining two or more of the elevation angles corresponding to the beacons are not separated from each other by at least 15 degrees of angular separation; or
estimating that the receiver is outdoors after determining the elevation angle condition specifies that each elevation angle range of m elevation angle ranges must includes at least one of the elevation angles corresponding to the beacons, and estimating that the receiver is indoors when any elevation angle range of the m elevation angle ranges does not include at least one of the elevation angles corresponding to the beacons.

25. The one or more non-transitory processor-readable media of claim 24, wherein the elevation angle condition specifies that each of the elevation angles corresponding to the beacons must be separated from each other by at least 15 degrees of angular separation, and wherein the method comprises:
estimating that the receiver is indoors when two or more of the elevation angles corresponding to the beacons are not separated from each other by at least 15 degrees of angular separation; and
estimating that the receiver is outdoors when each of the elevation angles corresponding to the beacons are separated from each other by at least 15 degrees of angular separation.

26. The one or more non-transitory processor-readable media of claim 24, wherein the elevation angle condition specifies that each elevation angle range of m elevation angle ranges must include at least one of the elevation angles corresponding to the beacons, wherein none of the elevation angle ranges from the m elevation angle ranges overlap with each other by more than five degrees, and wherein the method comprises:
estimating that the receiver is indoors when any elevation angle range of the m elevation angle ranges does not include at least one of the elevation angles corresponding to the beacons; and
estimating that the receiver is outdoors when each elevation angle range of the m elevation angle ranges includes at least one of the elevation angles corresponding to the beacons.

27. The one or more non-transitory processor-readable media of claim 26, wherein the beacons are satellites.

28. The one or more non-transitory processor-readable media of claim 26, wherein the beacons are terrestrial transmitters.

29. The one or more non-transitory processor-readable media of claim 26, wherein m is at least four.

30. One or more non-transitory processor-readable media embodying program instructions that, when executed by one or more processors, cause the one or more processors to implement a method for estimating whether a receiver is indoors or outdoors, the method comprising:
determining data associated with a plurality of beacons that specifies, for each of the beacons, (i) an azimuthal angle corresponding to the position of that beacon, (ii) an elevation angle corresponding to the position of that beacon, and (iii) a signal strength corresponding to that beacon;
determining that (i) any azimuthal angle range of n azimuthal angle ranges does not include a predetermined number of azimuthal angles from the azimuthal angles corresponding to the beacons, any elevation angle range of m elevation angle ranges does not include a predetermined number of elevation angles from the elevation angles corresponding to the beacons, or any signal strength of the signal strengths does not exceed a minimum signal strength threshold value, or (ii) each azimuthal angle range of the n azimuthal angle ranges includes the predetermined number of azimuthal angles from the azimuthal angles corresponding to the beacons, each elevation angle range of the m elevation angle ranges includes the predetermined number of elevation angles from the elevation angles corresponding to the beacons, and the signal strengths exceed the minimum signal strength threshold value; and estimating whether the receiver is indoors or outdoors based on (i) whether the azimuthal angles corresponding to the beacons meet an azimuthal angle condition, (ii) whether the elevation angles corresponding to the beacons meet an elevation angle condition, and (iii) whether the signal strengths corresponding to the beacons meet a signal strength condition by:

estimating that the receiver is indoors after determining that any azimuthal angle range of n azimuthal angle ranges does not include the predetermined number of azimuthal angles from the azimuthal angles corresponding to the beacons, any elevation angle range of m elevation angle ranges does not include the predetermined number of elevation angles from the elevation angles corresponding to the beacons, or any signal strength of the signal strengths does not exceed the minimum signal strength threshold value; and estimating that the receiver is outdoors after determining that each azimuthal angle range of the n azimuthal angle ranges includes the predetermined number of azimuthal angles from the azimuthal angles corresponding to the beacons, each elevation angle range of the m elevation angle ranges includes the predetermined number of elevation angles from the elevation angles corresponding to the beacons, and the signal strengths exceed the minimum signal strength threshold value.

31. The one or more non-transitory processor-readable media of claim 30, wherein the method comprises:

determining, for each of the beacons, a median signal strength based on two or more signal strengths measured for two or more signals that were transmitted by that beacon, wherein the data specifying, for each of the beacons, the signal strength corresponding to that beacon is the median signal strength for that beacon, wherein the minimum signal strength threshold value is a median signal strength threshold value, wherein the receiver is estimated to be indoors when any azimuthal angle range of the n azimuthal angle ranges does not include the predetermined number of azimuthal angles from the azimuthal angles corresponding to the beacons, when any elevation angle range of the m elevation angle ranges does not include the predetermined number of elevation angles from the elevation angles corresponding to the beacons, or when any median signal strength of the median signal strengths corresponding to the beacons does not exceed the median signal strength threshold value; and wherein the receiver is estimated to be outdoors when each azimuthal angle range of the n azimuthal angle ranges includes the predetermined number of azimuthal angles from the azimuthal angles corresponding to the beacons, when each elevation angle range of the m elevation angle ranges includes the predetermined number of elevation angles from the elevation angles corresponding to the beacons, and when the median signal strengths corresponding to the beacons exceed the median signal strength threshold value.

32. The one or more non-transitory processor-readable media of claim 30, wherein the beacons are satellites.

33. The one or more non-transitory processor-readable media of claim 30, wherein the beacons are terrestrial transmitters.

34. The one or more non-transitory processor-readable media of claim 30, wherein n is at least four, and m is at least four.

* * * * *